Sept. 16, 1958 H. J. LUTZ 2,851,814
FISH BAIT
Filed May 7, 1956

INVENTOR.
Harold J. Lutz
BY
ATTORNEY.

United States Patent Office 2,851,814
Patented Sept. 16, 1958

2,851,814

FISH BAIT

Harold J. Lutz, Kansas City, Mo.

Application May 7, 1956, Serial No. 583,006

3 Claims. (Cl. 43—42.15)

This invention relates to improvements in artificial bait, and more particularly to the provision of a fish lure that is highly animated and lifelike in the water by virtue of certain slits and notches provided therein for rendering the bait highly flexible at certain points throughout the length thereof.

It is the primary object of the instant invention to provide a lure in the nature of artificial bait made, for example, from animal flesh such as pork rind and provided with slits in the flesh portion thereof as well as opposed notches formed not only in such flesh, but in the rind itself to the end that as the bait is pulled through fishing waters, it will wiggle, squirm, slither and writhe in an animated manner simulating live bait.

Another important object of the instant invention is the provision of an artificial fish lure having a rind portion upon one face whereof is affixed by natural growth a layer of animal fish, the lure being shaped to simulate an eel, worm or similar live bait and having the aforementioned notches and slits strategically disposed to effect the said lifelike action in a number of directions as the lure is pulled through the water.

Figure 1:
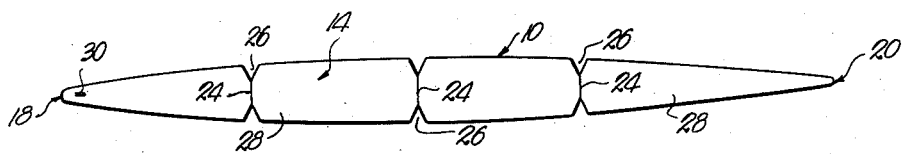
Figure 1 is a top plan view of fish bait made pursuant to my present invention.

The artificial fish bait or lure illustrated in the drawing consists of an elongated body broadly designated by the numeral 10 that is preferably made from pork rind or the like comprising an animal rind panel 12 having a layer 14 of animal flesh affixed to one face 16 of the panel 12 by natural growth. It is noted in Figure 1 of the drawing that in one direction the body 10 has a fusiform shape much in the nature of a spindle, cigar or radish with the ends 18 and 20 thereof tapered to relatively narrow points. Looking at the body 10 from the side thereof, however, as seen in Fig. 2, the lowermost face of body 10 is normally flat whereas the upper face is uniformly concave from end 18 to end 20 thereof, again tapering to relatively narrow dimensions at both of said ends and having its thickest portion substantially midway between end 18 and end 20.

Figure 3:
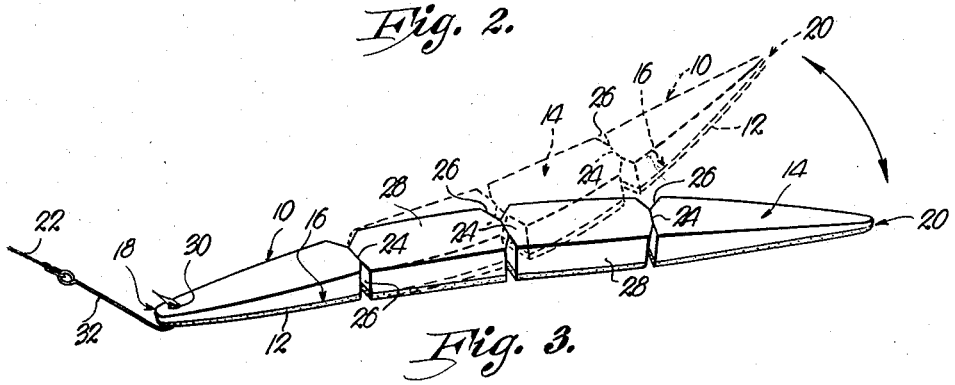
Fig. 3 is a perspective view illustrating the action of the bait in a lateral direction.
Figure 4:
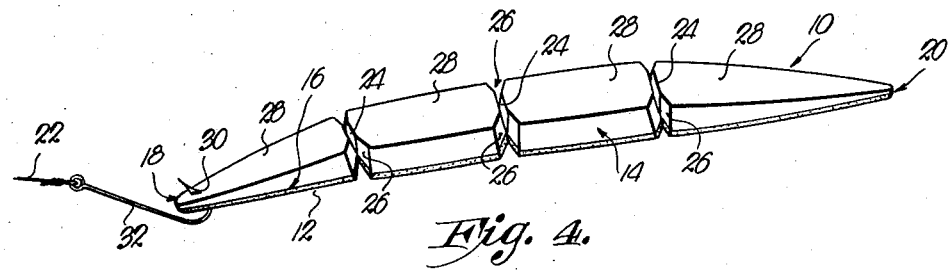
Fig. 4 is a perspective view illustrating the movement of the sections of the bait in a vertical direction.
Figure 5:
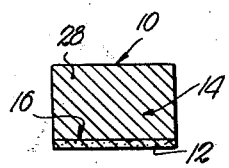
Fig. 5 is an enlarged, cross-sectional view taken on line V—V of Fig. 2.

In order to increase the flexibility of the body 10 and attain an animated, lifelike effect, when the body is drawn through water by line 22, a plurality of slits 24 and a number of opposed notches 26 are formed in the body 10. More particularly, the notches 26 which are substantially V-shaped are formed both in the panel 12 and the layer 14 of body 10 and the slits 24 are formed only in the layer 14 in interconnecting relationship to corresponding pairs of notches 26. There is presented, therefore, a plurality of relatively articulate sections 28 that move with respect to each other not only laterally as shown in Fig. 3 because of the notches 26, but vertically as shown in Fig. 4 by virtue of the flexibility afforded by slits 24.

Figure 2:
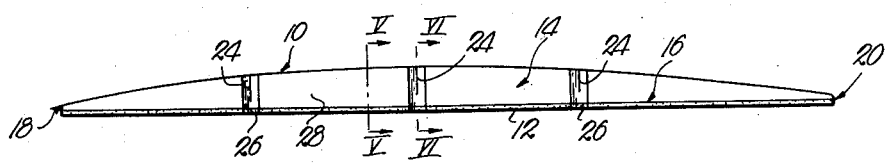
Fig. 2 is a side-elevational view thereof.
Figure 6:
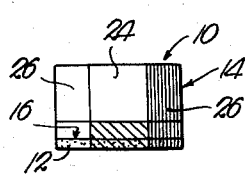
Fig. 6 is an enlarged, cross-sectional view taken on line VI—VI of Fig. 2.

It is to be noted in Figs. 2 and 6 of the drawing that the slits 24 terminate in spaced relationship to the normally uppermost face 16 of panel 12. Slits 24 present, therefore, in effect lines of weakness to allow for the flexing of the body 10 in the manner illustrated by Fig. 4 of the drawing. An opening 30 is formed in body 10 through panel 12 and layer 14 thereof adjacent the end 18 of body 10 for receiving fishhook 32 that is attached to line 22.

Having thus described the invention, what is claimed as new and desired to be secured by Letters Patent is:

1. A fish lure comprising an elongated body having an upper surface, a lower surface and a pair of opposed sides, there being a plurality of opposed notches extending inwardly from each of said sides and opening at both of said surfaces, rendering the body flexible in a horizontal direction, said body including an animal rind panel having a layer of animal flesh affixed to the upper face of the panel through natural growth, said layer having a number of slits, rendering the body flexible in a vertical direction, said slits interconnecting the notches and extending inwardly from said upper surface and terminating in spaced relation to said panel.

2. A fish lure comprising an elongated body having an upper surface, a lower surface and a pair of opposed sides, there being a plurality of notches extending inwardly from each of said sides and opening at both of said surfaces, rendering the body flexible in a horizontal direction, said body including an animal rind panel having a layer of animal flesh affixed to the upper face of the panel through natural growth, said layer having a number of slits and a plurality of flat, normally parallel, abutting walls at said slits, said slits joining said notches and extending transversely of the layer between said sides inwardly from said upper surface and terminating in spaced relationship to said panel, whereby to render the body flexible in a vertical direction.

3. A fish lure comprising an elongated body having a convex upper surface, a normally flat lower surface and a pair of opposed flat sides, there being a plurality of opposed notches extending inwardly from each of said sides and opening at both of said surfaces, rendering the body flexible in a horizontal direction, said notches having vertical walls disposed in perpendicular relationship to said lower surface, said body including an animal rind panel having a layer of animal flesh affixed to the upper face of the panel through natural growth, said layer having a number of slits and a plurality of flat, normally parallel walls at said slits, said walls normally abutting throughout their entire area, said slits extending transversely of the layer between said sides inwardly from said upper surface and terminating in spaced relationship to said upper face of the panel whereby to render the body flexible in a vertical direction, the notches being V-shaped, each slit interconnecting a pair of notches at the apexes of the notches, said rind and the flesh disposed between the rind and the end of the slit cooperating to form hinges for movement of the body in all directions.

References Cited in the file of this patent

UNITED STATES PATENTS

| | | |
|---|---|---|
| 879,869 | Hansen | Feb. 25, 1908 |
| 1,429,571 | Davis | Sept. 19, 1922 |
| 1,485,643 | Streich | Mar. 4, 1924 |
| 1,593,604 | Schreiner et al. | July 27, 1926 |
| 2,290,433 | Jeffers | July 21, 1942 |
| 2,501,449 | Lutz et al. | Mar. 21, 1950 |
| 2,724,205 | Howard | Nov. 22, 1955 |